Nov. 21, 1950 F. H. CLARK ET AL 2,530,566

FILING DEVICE

Filed May 1, 1946 5 Sheets-Sheet 1

INVENTORS.
Floyd H. Clark, Bengt M. Hager
and Oscar J. Larson
BY Parker, Prochnow & Farmer,
Attorneys.

Nov. 21, 1950 F. H. CLARK ET AL 2,530,566

FILING DEVICE

Filed May 1, 1946 5 Sheets-Sheet 2

INVENTORS.
Floyd H. Clark, Bengt M. Hager and Oscar J. Larson
BY Parker, Prochnow & Farmer,
Attorney.

Nov. 21, 1950 F. H. CLARK ET AL 2,530,566

FILING DEVICE

Filed May 1, 1946 5 Sheets-Sheet 3

INVENTORS.
Floyd H. Clark, Bengt M. Hager
and Oscar J. Larson

BY Parker, Prochnow & Farmer

Attorneys.

Nov. 21, 1950 F. H. CLARK ET AL 2,530,566

FILING DEVICE

Filed May 1, 1946 5 Sheets-Sheet 4

INVENTORS.
Floyd H. Clark, Bengt M. Hager
and Oscar J. Larson
BY Parker Prochnow & Farmer
Attorneys.

Nov. 21, 1950 F. H. CLARK ET AL 2,530,566

FILING DEVICE

Filed May 1, 1946 5 Sheets-Sheet 5

INVENTORS.
Floyd H. Clark, Bengt M. Hager and Oscar J. Larson

BY Parker, Prochnow & Farmer

Attorneys.

Patented Nov. 21, 1950 2,530,566

UNITED STATES PATENT OFFICE 2,530,566

FILING DEVICE

Floyd H. Clark, Douglaston, and Bengt M. Hager and Oscar J. Larson, Jamestown, N. Y., assignors to Art Metal Construction Company, Jamestown, N. Y.

Application May 1, 1946, Serial No. 666,334

13 Claims. (Cl. 45—3)

This invention relates to files or filing devices for reference or record cards, addressograph plates and other more or less analogous articles, and has for one of its objects to provide a practical, desirable and novel file in which a number of holders or receptacles for the file cards or articles are mounted on a rotatable carrier, by the rotation of which any of the various file holders may be moved quickly and with a minimum of effort to and from an exposed or convenient position for ready reference to the filed material, for placing articles in and removing them from the holders or for other purposes.

Other objects of the invention are to provide a filing device in which the rotatable carrier with its file holders or receptacles is arranged so as to be housed or protected in a case or cabinet with a portion of the carrier exposed at or projecting through an opening, preferably at the top of the case, which has a movable cover or closure section whereby, by rotating the carrier, any of the file holders or receptacles can be brought from a housed position in the case to a conveniently accessible position at or through the case opening when the cover is opened; also to suspend or mount the file holders or receptacles on their rotatable carrier in such manner that they can swing relatively to the carrier in the rotation of the latter, so as to remain upright or in their operative article-retaining relation in any rotary position of the carrier; also to provide means for ensuring that the file holders or receptacles will be maintained always in such upright or operative relation notwithstanding the rotation thereof with the carrier; and also to provide effective but essentially simple and desirable means for thus maintaining the file holders or receptacles upright or operative during the rotation of and in all rotary positions of their carrier.

Additional objects of the invention are to provide convenient and readily operable brake or holding means for holding the carrier from rotation with any required file holder or receptacle in a desired accessible position, and for releasing the carrier to permit its rotation to bring any other holder or receptacle to such accessible position; also to provide desirable brake means which normally hold the carrier from rotation and are conveniently operable by a foot treadle for releasing the brake to permit rotation of the carrier.

Still another object is to provide a brake or holding mechanism for the rotatable carrier including an actuating foot treadle which may be readily arranged at either of opposite ends of the cabinet to adapt the device for convenient use either at the right or left hand side of the operator.

Further objects and advantages of the invention will appear from the following specification of the preferred embodiment of the invention shown in the accompanying drawings, and the novel features of the invention are set forth in the appended claims.

Figure 1:
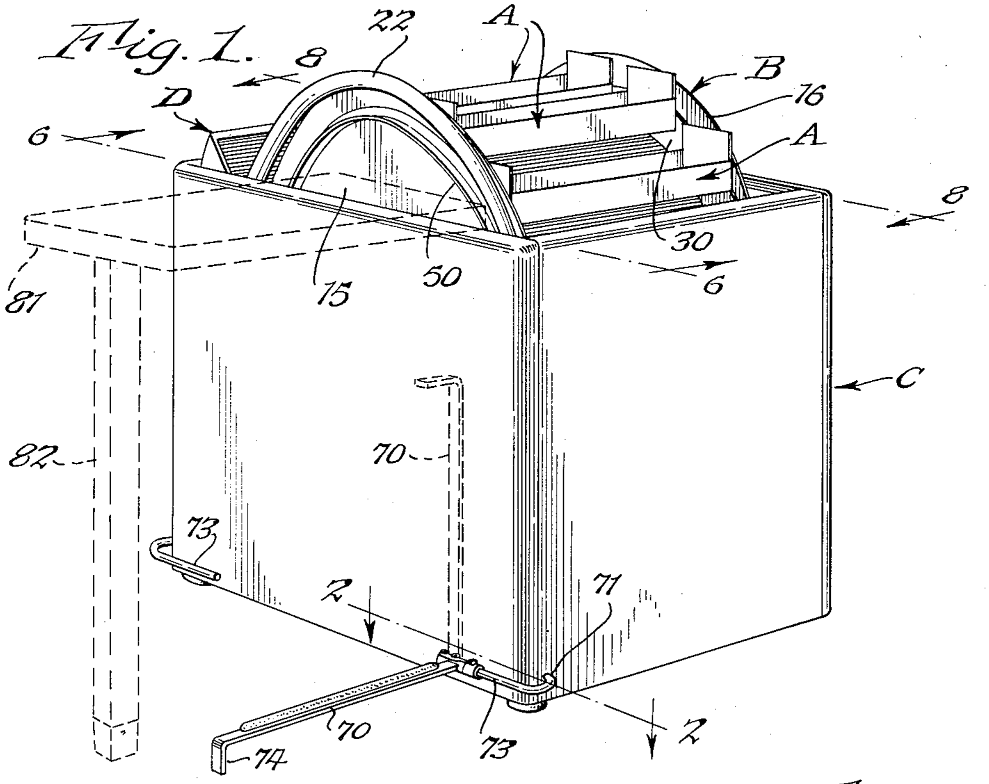
Fig. 1 is a perspective view of a filing device embodying the invention, showing the cabinet cover section opened.
Figure 4:
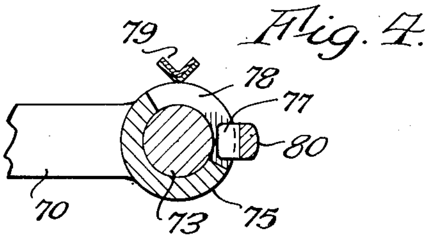
Figs. 4 and 5 are sectional views thereof on line 4—4, Fig. 2 respectively indicating the operative and folded positions of the treadle.
Figures 6, 7:
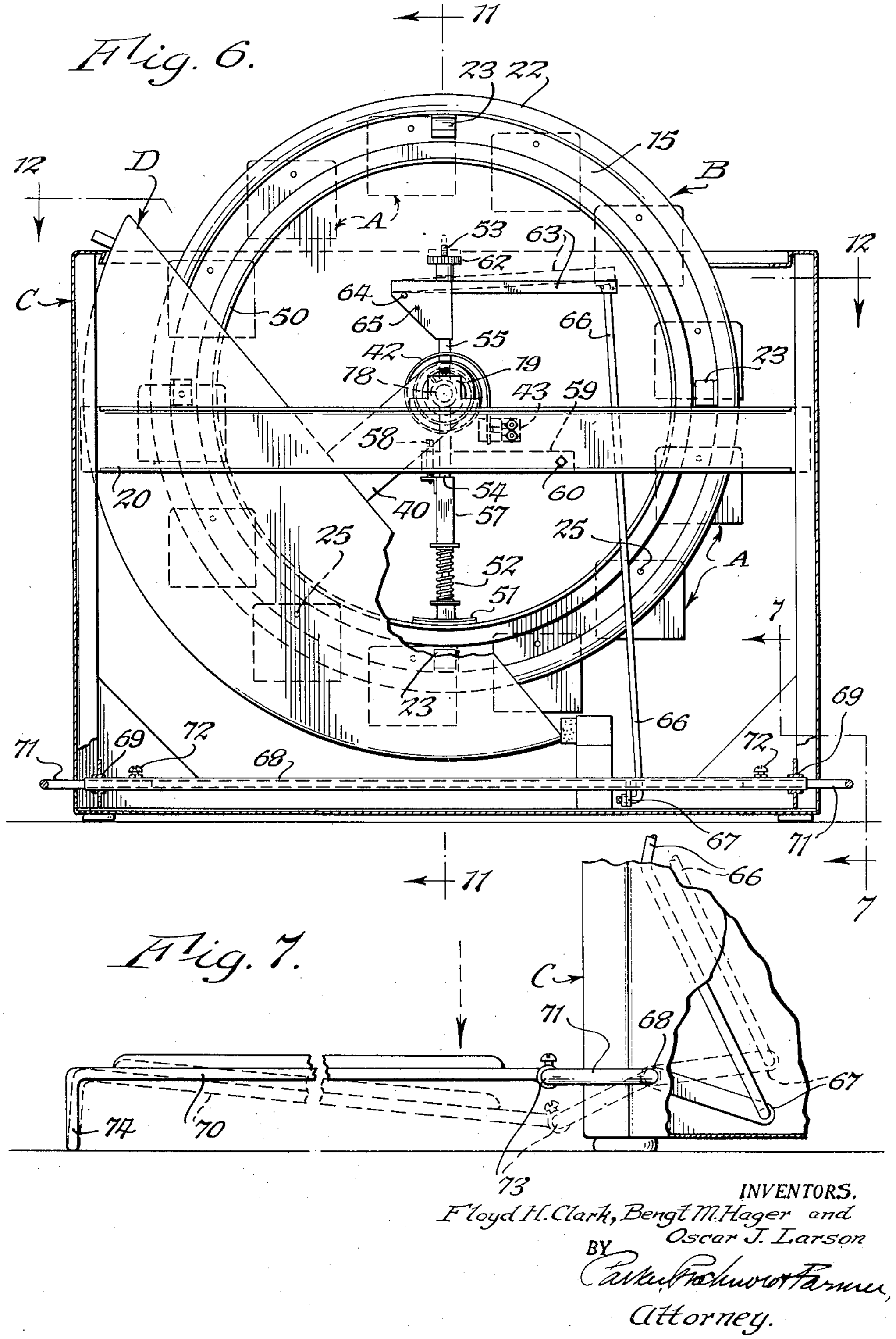
Fig. 6 is a longitudinal, sectional elevation of the filing device on line 6—6, Fig. 1.
Fig. 7 is a transverse, sectional elevation on line 7—7, Fig. 6, showing part of the brake actuating mechanism.
Figure 8:
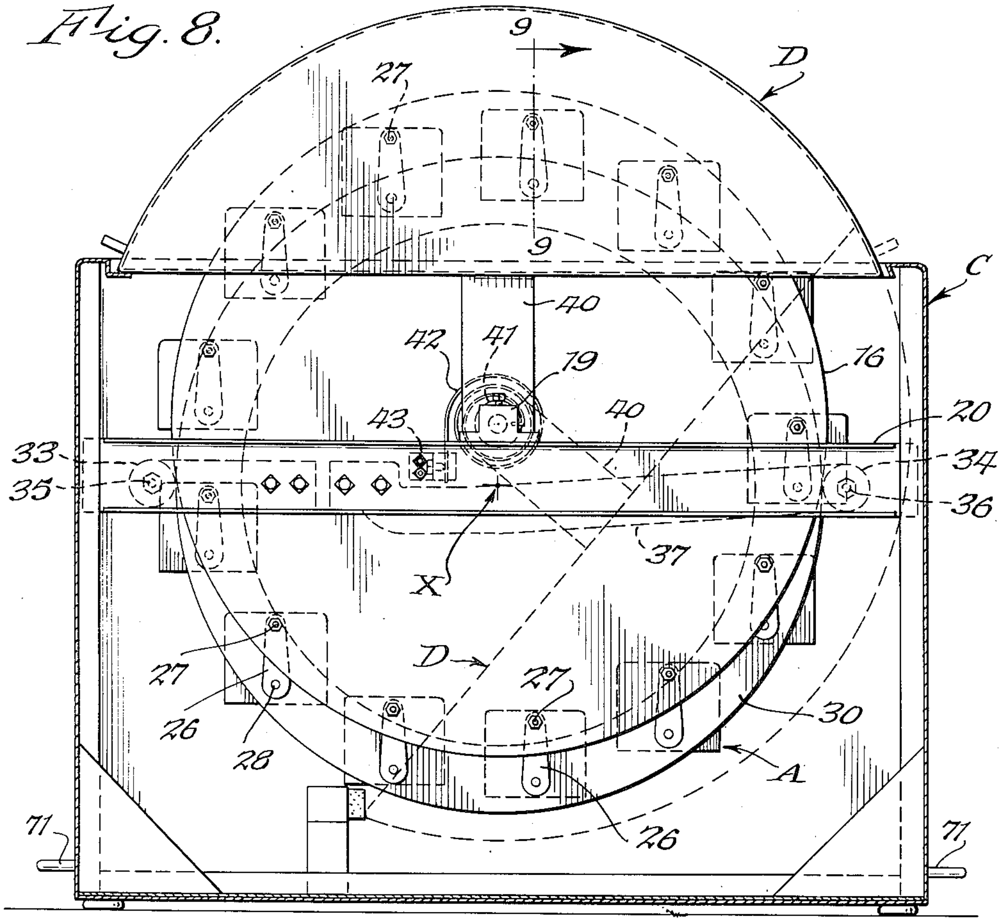
Fig. 8 is a longitudinal, sectional elevation of the filing device on line 8—8, Fig. 1, showing the cabinet cover section closed.

In the preferred embodiment of the invention illustrated in the drawings, the filing device comprises a number of file holders or receptacles A for the file cards or articles mounted on a rotatable carrier B in a circular series at suitably spaced intervals about the axis of rotation of the carrier, which is mounted to rotate in the body C of a supporting and protecting case or cabinet with a portion of the carrier adapted to project somewhat out through and above the open top of the body of the case, which latter is preferably provided with a cover or closure section D arranged to be moved from an open position, shown in Figs. 1 and 6, within the body of the case, which leaves the protruding portion of the carrier and the file holders thereon exposed and accessible, to a closed position shown in Fig. 8, in which the cover overlies the protruding portion of carrier and file holders and closes the top opening of the case body for enclosing and protecting the filed material.

The case or cabinet may be of any suitable construction, that shown comprising a sheet metal body C of rectangular shape both in plan and elevation with an open upper end, and a sheet metal cover section D, which may be of hollow, segmental cylindrical shape and is pivotally mounted in the case body to swing concentrically about the rotatable carrier B from its open position within the case to a position in which it covers the protruding upper portion of the carrier and closes the top opening of the case body, see Fig. 8.

The rotatable carrier B for the file holders A, as shown, comprises circular disks 15 and 16 at opposite ends of and connected by a hollow, central body or hub 17 which may be of rectangular or other suitable cross sectional shape and welded or otherwise suitably secured to the end disks 15 and 16. This carrier may be mounted to rotate in the file case about a horizontal axis, as on a horizontal shaft 18 which extends centrally through the carrier, with its opposite ends supported in suitable bearings 19 on horizontal cross bars 20 stationarily fixed in the opposite ends of the case body C. As shown, the shaft 18 is stationary, and the carrier B is mounted to rotate on the shaft 18 by means of suitable bearings, preferably ball bearings 21, having inner and outer race members respectively secured on the shaft 18 and on the end disks of the carrier. A circular hand rail 22 is preferably secured to the end disk 15 of the carrier at the outer side thereof and spaced therefrom, as by brackets 23 to provide convenient means for turning the carrier.

The file holders A may be of any suitable form and construction adapted to hold the file articles or material in a required order or arrangement, and the holders may be varied as to dimensions to suit file cards or articles of different sizes, the numbers and spacing of the holders on the rotatable carrier or the size of the carrier being varied as required, depending upon the size of the cards or articles to be accommodated. Each holder may be in the form of elongated, shallow, rectangular tray or receptacle in which the file cards or articles are adapted to stand on edge transversely in the receptacle, or the holder may be in the nature of a holding device of any suitable type adapted to releasably receive or support a removable lift-out tray or receptacle for the file cards or articles. The holders shown consist of like, shallow, rectangular trays arranged lengthwise or parallel with the axis of the carrier between the carrier end disks 15 and 16 with the holders suitably spaced apart in a circular series, by preference, adjacent the periphery of the carrier. Preferably the holders are spaced equidistantly about and concentrically with the axis of the carrier whereby the carrier with the holders will be approximately balanced so as to turn freely when the holders are empty or are all approximately equally filled, the distance apart of the holders, depending upon the dimensions and the number thereof on the carrier and being such as to enable the holders, which are pivotally mounted on the carrier, to have a limited swing relatively to the carrier in the rotation thereof, such that the holders are adapted to remain in the same upright or operative article-holding relation in all positions thereof, due to the rotation of the carrier.

Figure 9:
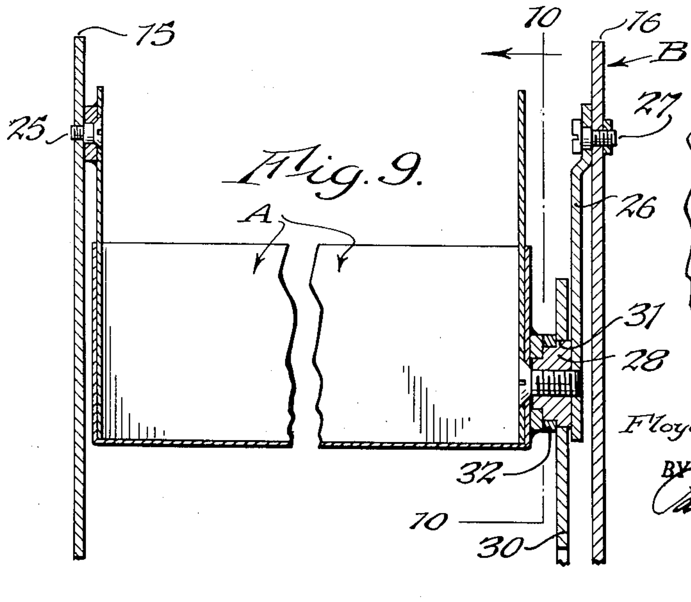
Fig. 9 is a transverse section, enlarged, on line 9—9, Fig. 8, showing the pivotal mounting and controlling means of one of the file holders.
Figure 10:
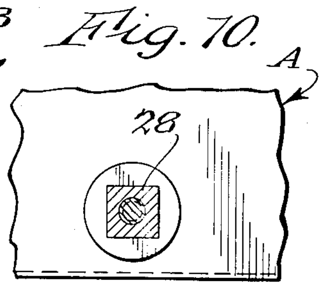
Fig. 10 is a sectional elevation on line 10—10, Fig. 9.
Figure 11:
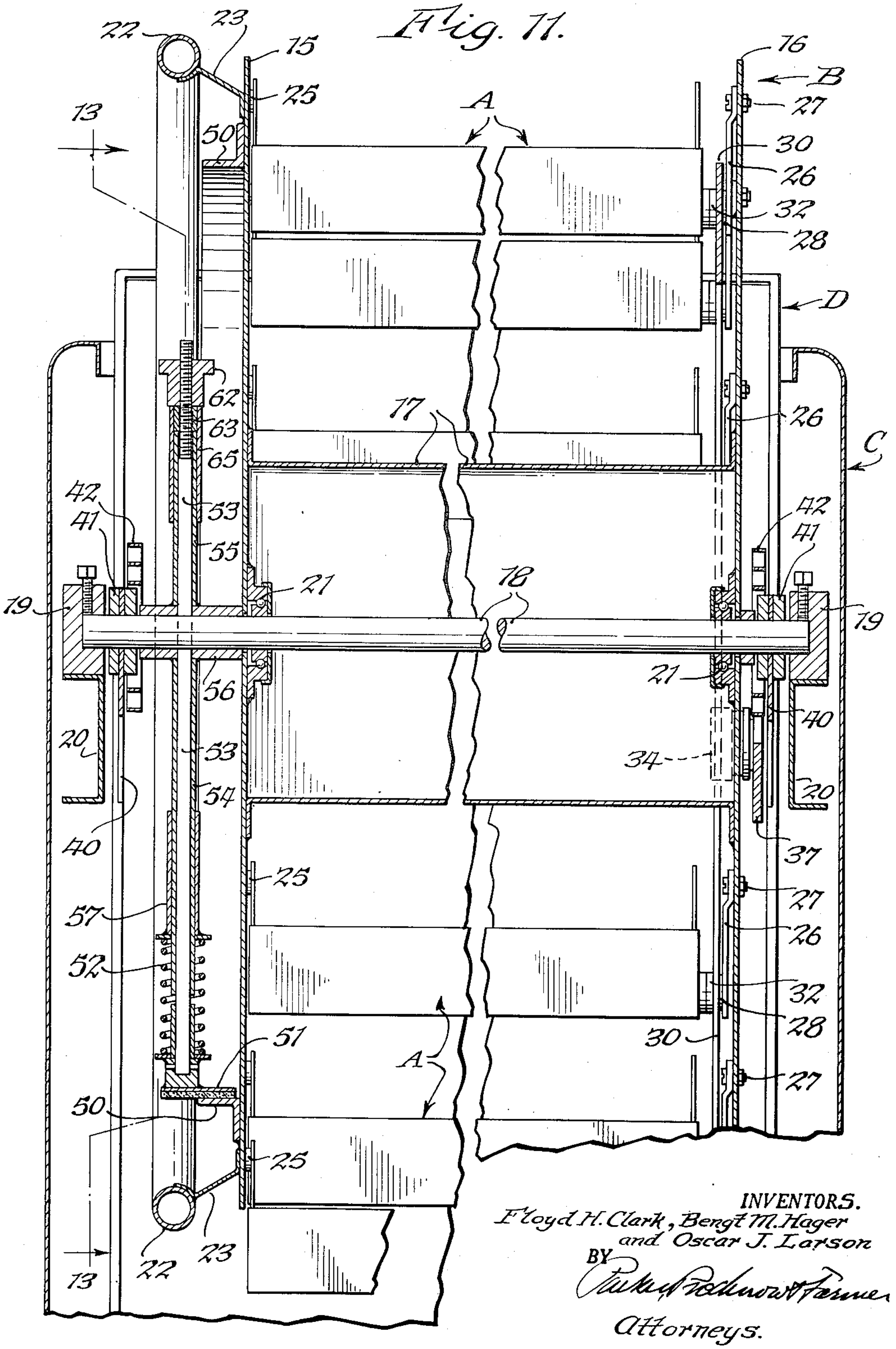
Fig. 11 is a broken, transverse sectional elevation of the filing device on line 11—11, Fig. 6, but on a larger scale.

As shown, each file holder is pivotally suspended at its opposite ends on the end disks 15 and 16 of the carrier at points above the bottom of center of gravity of the holder to adapt the holder to swing relatively to the carrier. For this purpose, as best shown in Figs. 9 and 11, one end wall of the holder is pivoted to the adjacent carrier disk 15 by a suitable pivot stud 25, and at the opposite end a suspension arm 26 is fixed at its lower end to the holder and is pivoted at its upper end by a suitable pivot stud 27 to the adjacent carrier disk 16, the suspension arm 26 being spaced outwardly away from the end wall of the file holder or receptacle but rigidly attached thereto at its lower end by a stud or bolt 28 which is suitably secured rigidly to the end of the file holder and to the suspension arm and provides between the arm and the end of the file holder a pivot for connection with controlling means, to be presently described. The suspension pivots for the opposite end of the holder are such as to ensure free swinging or pivotal movement of the holder without binding on the pivot studs, the studs 25 and 27 being for this purpose shouldered studs screwed into the carrier disks. The suspension arm swings freely on the stud 27 between the shoulder and the head thereof. Similarly, the other stud 25 is shouldered and headed with the end wall of the holder freely swinging on the stud between its shoulder and head. Thus, each file holder is suspended to hang freely and swing relatively to the carrier in the rotation of the latter to enable the file holder to remain upright in any location thereof, due to the rotation of the carrier.

In order to ensure that the file holders will be maintained always in their intended upright or operative relation and prevented from possible tilting from that relation, due to rotation of the carrier, and failure of the holders to swing freely at their pivotal connections to the carrier, the several holders are connected to controlling means which, in the rotation of the carrier, shift relatively to the carrier in such a way as to cause a relative swing of the holders on the carrier to the extent required to always maintain the holders in such operative relation. Simple and efficient means for this purpose are illustrated in the drawings, see particularly Figs. 8, 9, 11 and 12, consisting of a controlling ring 30 which is arranged to rotate in a plane parallel with the plane of rotation of the carrier, and about a center eccentric to the axis of the carrier, and is pivotally connected to the several holders A by the studs 28, which pass through and are adapted to turn in bearing holes 31 in the controlling ring 30 during the rotation of the carrier. Preferably each hole 31 in the ring is circular and surrounds a shouldered portion of the stud 28 that passes through that hole, between the suspension arm 26 for the associated file holder and a washer 32 surrounding the stud 28 at the opposite side of the controlling ring 30 to ensure the free turning of the stud in the hole. The controlling ring being thus pivotally connected by the studs 28 to the file holders at points spaced from the pivotal suspension points of the file holders with the rotary carrier disks by the studs 25, 27 is supported and carried around with the carrier in the rotations of the latter, but the controlling ring is confined so as to turn about an axis shown at X, Fig. 8, eccentric to the axis of rotation of the carrier, which axis X is preferably spaced below the axis of rotation of the carrier B, a distance equal to the distance between the pivotal suspension point of each holder with the carrier and the center of the stud 28 that connects said holder with the controlling ring. As shown, the controlling ring is thus confined and caused to turn about its eccentric axis X by two guide rollers 33 and 34 mounted to revolve about fixed axes in rolling contact with the peripheral edge of the controlling ring 30 at approximately diametrically opposite parts of the ring. As shown, the roller 33 is journalled to rotate freely on a stud axle 35 secured, as by a bracket, to one of the stationary cross bars 20 of the file case C, and the second roller 34 is journalled to rotate freely on a stud 36 fixed to a supporting bracket 37 which is bolted or fixed at one end in any suitable manner to the cross bar 20 but is offset laterally therefrom for a purpose hereinafter explained. The rollers 33, 34 preferably have peripheral clearance grooves 38 for the edge of the carrier disk 16. Since in the rotation of the carrier B, the controlling ring 30 is thus caused to turn about an axis eccentric to the axis of rotation of the carrier and is pivotally connected to the file holders A at points which are spaced from their pivotal suspension points a distance equal to the distance between the axes of rotation of the carrier and controlling ring, it follows that the controlling ring will swing the holders A about their suspension points relatively to the carrier, in the rotation of the latter, in such a way and to such an extent as to maintain the holders always upright or in their operative relation, as shown in Fig. 8, regardless of the different locations to which the holders are carried by the rotation of the carrier.

The cover D of the file case may be mounted to swing from its open to its closed position over the top portion of the rotatable holder carrier by means of radial arms 40 which are rigidly secured by welding or otherwise to the segmental end walls of the cover and are provided at their inner ends with hubs 41 which surround and are adapted to turn on the carrier supporting shaft 18 between the end bearings 19 for the shaft and the bearings 21 for the carrier B. In the swinging of the cover to and from its open and closed positions, one of its supporting arms 40 is adapted to pass through the space between the adjacent case cross bar 20 and the offset bracket 37 for the guide roller 34 for the controlling ring. The weight of the cover may be counterbalanced, at least in part, so as to facilitate its operation by counterbalancing spiral springs 42 arranged adjacent the cover supporting arms 40 and coiled about the shaft 18 with the inner end of each spring connected to the hub of the adjacent cover arm 40 and its outer end anchored to a suitable stationary part, such as a bracket 43 fixed on the adjacent cross bar 20 of the case C. The cover could be pivotally or swingingly mounted in any other suitable way and any other suitable counterbalancing means for the cover could be provided.

Figures 12, 13:
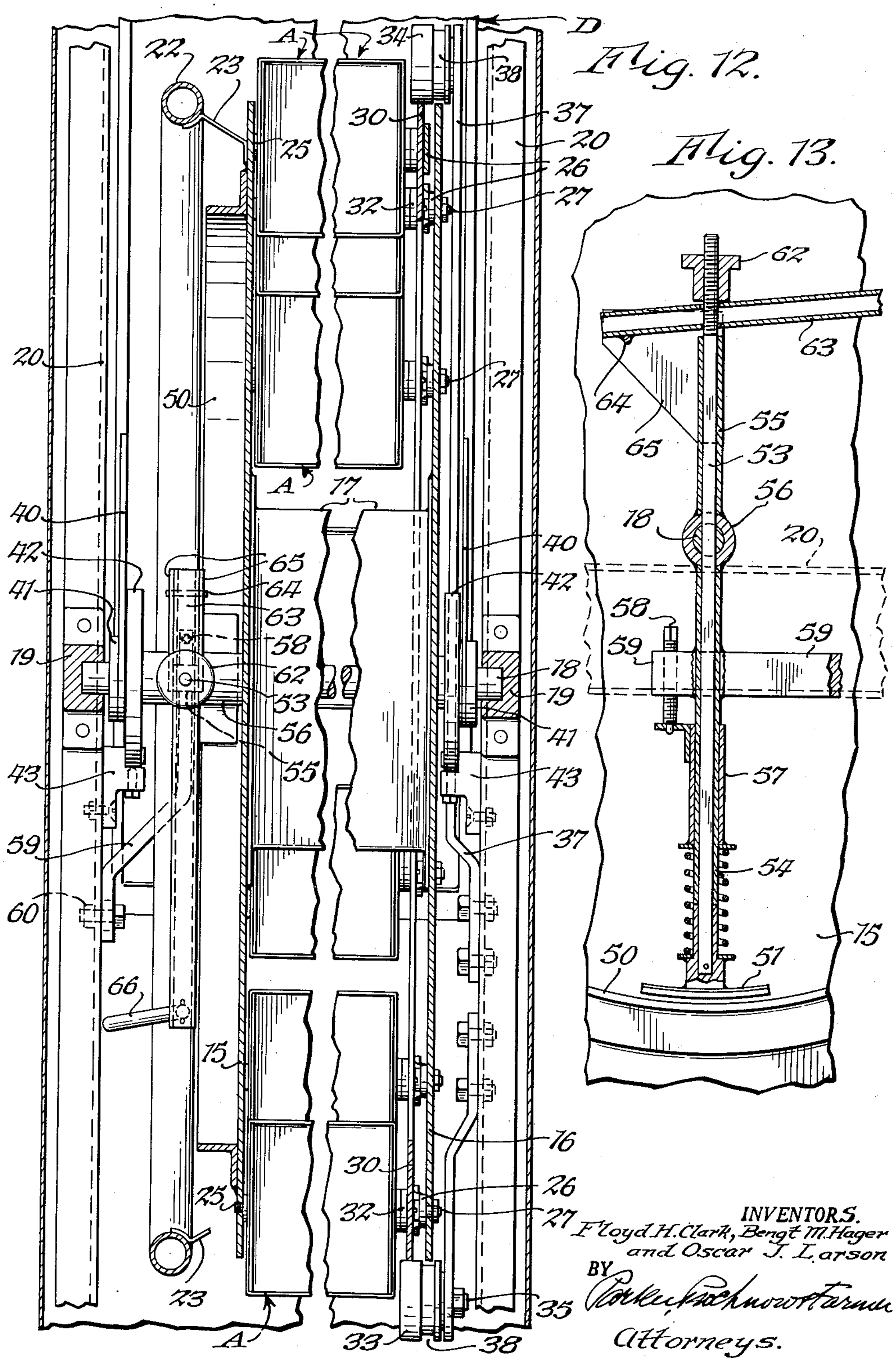
Fig. 12 is a broken, sectional plan view on an enlarged scale on line 12—12, Fig. 6.
Fig. 13 is a vertical sectional elevation of the brake mechanism on line 13—13, Fig. 11.

The brake shown in the drawings for releasably holding the rotatable carrier B in any of its various rotary adjustments and for readily releasing the carrier to permit it to be turned to any other required position, comprises a circular brake ring or band 50 welded or otherwise suitably secured to one of the carrier end disks, as the disk 15, concentrically with its axis, and a brake shoe 51 faced with a suitable friction material which is normally pressed by a spring 52 into frictional holding engagement with the brake band 50. As shown in Figs. 6, 11 and 13, the brake shoe is fixed on the outer end of a radial rod 53 which passes through a hole in the stationary carrier shaft 18 and is movable and guided lengthwise in square or non-circular guide tubes 54, 55, welded or otherwise suitably attached rigidly to a sleeve 56 surrounding the shaft 18 between one of the carrier bearings 21 and the hub of the adjacent cover arm 40. The brake spring 52 is shown as a coil compression spring surrounding the guide tube 54 between a shoulder of the brake shoe 51 and an adjusting sleeve 57 that surrounds and is adjusted lengthwise on the guide tube 54, for regulating the pressure of the spring, as by a screw 58 arranged to turn in a threaded hole in a stationary bracket 59 and engaging a projection on the adjusting sleeve 58. The bracket 59 for the adjusting screw may be bolted stationarily at one end at 60 to the adjacent cross bar 20 of the file case, and this bracket, which is offset from the cross bar, may be welded or otherwise secured near its outer end to the guide sleeve 54 for the brake rod 53 for bracing and holding the guide tube rigidly in place. Screwed on the threaded upper or inner end of the brake rod 53 is an adjustable finger nut 62 that bears down on a lever 63 which is suitably fulcrumed at one end on a cross pin 64 connecting bracket plates 65 which may be fixed, as by welding, to and project laterally from the guide tube 55 for the brake rod. The brake shoe 51 is released or moved out of engagement with the brake ring 50 by lifting the outer end of the lever 63, and the screw connection of the nut 62 with the brake rod enables adjustment of the nut to ensure a proper releasing action of the brake shoe by movement of the lever 63. By means of the adjusting screw 58, the tension or pressure of the brake spring 52 can be increased or decreased as may be required, to ensure positive holding of the carrier in any of its rotary adjustments, regardless of a possible unbalanced condition of the carrier due to unequal loading of the different file holders, while at the same time the pressure of the brake shoe against the brake band can be adjusted so as to be no greater than required to properly hold the carrier from movement except upon freeing it by releasing the brake.

Figures 2, 3:
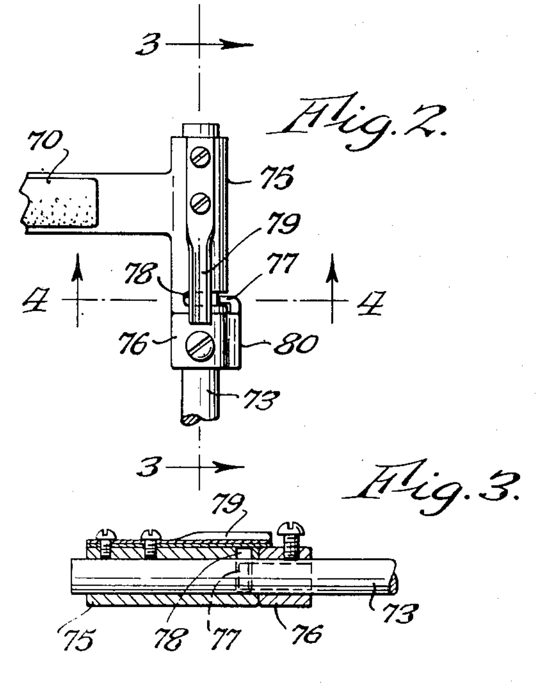
Fig. 2 is a fragmentary plan view of the actuating treadle of the brake for the rotatable file holder carrier, as indicated by the section line 2—2, Fig. 1.
Fig. 3 is a longitudinal, sectional view thereof on line 3—3, Fig. 2.
Figure 5:
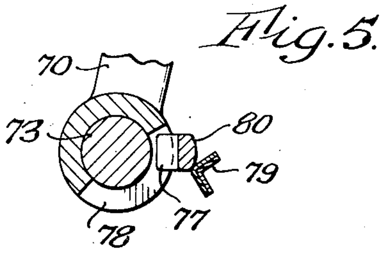

Preferably the brake-releasing lever 63 is operatively connected to a brake-operating foot treadle 70, Figs. 1, 2 and 7, for which purpose, as shown, a rod 66 suitably connected to the free end of the lever 63 is connected at its opposite end to an arm 67 on a rock shaft 68 to which the foot treadle is connected for rocking the shaft. By preference the rock shaft extends lengthwise in the body C of the file case and is suitably journalled at its opposite ends in bearings 69 at the opposite ends of the case body. At its opposite ends the rock shaft, which may be tubular, is provided with extension rods 71 each of which is endwise adjustable in and secured in the rock shaft, as by a set screw 72, and each extension rod extends out through a hole in the adjacent end wall of the case body and is bent into U-form to provide an end portion 73 which is offset from and extends inwardly parallel with the rock shaft, but outside of the adjacent side wall of the case body, for the attachment to said end portion 73 of the foot treadle 70, for rocking the rock shaft. Thus, the foot treadle 70 may be attached to the rock shaft 68 at either end of the file case in position to enable easy operation of the treadle by the foot of the operator sitting at the side of the file case, whether the case may be placed at the right or left hand side of the operator, thus enabling the file device to be placed either in a right hand or left hand position for operation.

The treadle 70 shown is in the form of a bar provided with a downbent, outer end 74 adapted to bear on the floor, and has a tubular socket 75 at its inner end adapted to be sleeved on either extension end portion 73 of the rock shaft so that by depressing the inner end of the treadle bar it will swing about its downturned outer end as a fulcrum and rock the rock shaft for releasing the brake. The treadle bar may be releasably, and preferably foldably, secured to the portion 73 of the rock shaft extension in any convenient manner enabling ready removal so that it can be easily applied to the extension at one or the other end of the rock shaft, as may be required. As shown, a collar 76 is secured by a set screw on the shaft extension portion 73, and this collar is provided with a hooked lug 77 arranged to enter an elongated transverse slot 78 in the socket 75 of the treadle bar. The collar thus holds the treadle bar in connection with the shaft extension while permitting the socket end of the treadle bar to pivot on the extension portion 73 and to be turned thereon from a horizontally extending operative position to a folded, standing inoperative position beside the side of the file case, as shown in full and broken lines in Fig. 1, the slot 78 in the socket piece being long enough to permit this folding movement of the treadle bar on the shaft extension. A spring finger 79 secured to the socket piece of the treadle bar and having its resilient free end adapted to spring over a hump or eccentric portion 80 of the collar 76, acts to releasably hold the treadle bar up in its folded inoperative position at the side of the file case.

In the use of the filing device the brake means described releasably holds the rotatable carrier for the file holders stationary with one or more of the file holders exposed at or above the open top of the file case and readily accessible for reference thereto or for inserting or removing articles to and from the holders when the cover section of the case is open. The operator can stand or sit at the side of the device where the brake treadle is located in position for conveniently operating the treadle with the foot, and when it is desired to bring another file holder to reference or accessible position, the foot treadle is depressed to release the carrier, which can then be turned to the required position by means of the hand rail 22 which is located in convenient reach at the near side of the device. A writing table or shelf, indicated by broken lines at 81 in Fig. 1, may be provided for the convenience of the operator in writing records or for other purposes in the use of the filing device. This table, conveniently, may be supported at its inner end on the top edge of the near side wall of the case C to which it may be removably secured in any suitable manner, and by a supporting leg 82 at the outer end of the table or shelf. The described adaptability of the foot treadle to be applied at either end of the file case enables the filing device to be placed in position for use at either the right hand or left hand side of the operator.

We claim as our invention:

1. A filing device comprising a file case having a top opening, a rotatable carrier having opposite circular end members and mounted to rotate in said case about an approximately horizontal axis with the upper portions of said end members protruding out of said top opening of the case, file holders extending between and swingably mounted on said carrier end members at spaced points about the axis of the carrier to rotate with the carrier and to swing relatively thereto in the rotation of the carrier for maintaining the file holders upright in the rotation of the carrier, a circular hand rail on one of said end members adjacent its periphery for rotating said carrier, an annular ring secured to said carrier concentrically to its axis of rotation, brake means operable against and away from said ring for releasably holding said carrier from rotation, a spring for pressing said brake means against said ring, a foot treadle located adjacent the side of said case adjacent to which said hand rail is located and operatively connected to said brake means and operable to move said brake means against the action of said spring to release said carrier for rotation by means of said hand rail.

2. A filing device according to claim 1, in which said circular hand rail is located at the outer side of and spaced from the carrier end member to which it is attached.

3. A filing device according to claim 1, in which said brake means includes a rock shaft within and extending lengthwise through said file case approximately parallel with and adjacent said carrier end member to which said hand rail is attached, said brake means having a crank arm on each end, and a brake treadle attachable to either crank arm of said shaft and located externally of said case and operable for actuating said brake means to permit rotation of said carrier.

4. A filing device comprising a file case having an opening in its upper portion, a rotatable carrier having opposite separated end members and mounted to rotate in said case about an approximately horizontal axis with the upper portion of said carrier exposed at the opening of said case, file holders arranged between said carrier end members, means pivotally mounting said file holders on said end members at spaced points about the axis of the carrier to rotate therewith and to swing relatively thereto for maintaining the file holders upright in the rotation of the carrier, a controlling ring arranged between the inner side of one of said carrier end members and the adjacent ends of said file holders and pivotally connected with each file holder at a point spaced vertically from the pivotal connection of said file holder with said carrier end member, and means for confining said controlling ring to rotate with said carrier about an axis spaced vertically from the axis of the carrier for swinging said file holders relatively to the carrier to positively maintain the file holders upright in the rotation of the carrier.

5. A filing device comprising a file case having an opening in its upper portion, a rotatable carrier having opposite circular end members and mounted to rotate in said case about an approximately horizontal axis with the upper portion of said carrier exposed at the opening of said case, file holders arranged between said carrier end members, means pivotally mounting said file holders on said end members at spaced points about the axis of the carrier to rotate therewith and to swing relatively thereto for maintaining the file holders upright in the rotation of the carrier, said mounting means for each file holder including an arm located between one of said carrier end members and the adjacent end of the file holder and fixed by a lateral stud to the file holder and pivoted at a point above said stud to said end member, a controlling ring arranged between said arms and the adjacent ends of said file holders and pivotally connected with said lateral studs of said file holders, and means for confining said controlling ring to rotate with said carrier about an axis spaced downwardly from the axis of the carrier for swinging said file holders relatively to the carrier to positively maintain the file holders upright in the rotation of the carrier.

6. A filing device comprising a file case having an opening in its upper portion, a carrier having opposite end members and mounted to rotate in said case about an approximately horizontal axis, file holders arranged between and pivotally mounted on said carrier end members at spaced points about the axis of the carrier to rotate with the carrier and to swing relatively thereto in the rotation of the carrier, said file holders being brought in succession to exposed positions at said case opening by rotation of said carrier, a controlling ring arranged between one of said carrier end member and the adjacent ends of said file holders to rotate parallel with the plane of rotation of the carrier and pivotally connected to each of said file holders at a point spaced downwardly from the pivotal connection of said file holder with said carrier end members, and means for confining said controlling ring to rotate with the carrier about an axis spaced downwardly from the axis of the carrier a distance equal to the distance between the pivotal connections of each file holder with the carrier and with said controlling ring, for swinging said file holders relatively to the carrier to cause the file holders to always face the same way in the rotation of the carrier.

7. A filing device according to claim 6, in which guide rollers are journalled on a stationary part of said filing device in rolling engagement with the periphery of said controlling ring for confining said ring to rotate about said axis spaced from the axis of the carrier.

8. A filing device comprising a file case having an opening in its upper portion, a carrier having opposite end members and mounted to rotate in said case about an approximately horizontal axis, file holders arranged between and pivotally mounted on said carrier end members at spaced points about the axis of the carrier to rotate with the carrier and to swing relatively thereto in the rotation of the carrier, said file holders being brought in succession to exposed positions at said case opening by rotation of said carrier, and controlling means having an annular controlling ring pivotally coupled to the holders, eccentric to their pivotal mountings, for swinging said file holders relatively to said carrier to maintain the file holders upright in the rotation of the carrier.

9. In a filing device having a housing open at the top, a file carrier rotatably mounted therein for rotation about a horizontal axis, a plurality of file holders on the peripheral part of said carrier brought in succession into exposed position at the open top of the housing upon rotation of the carrier, that improvement which comprises the combination with said carrier and housing, of an endless ring concentric with said axis and attached to said carrier to rotate therewith, a radially disposed brake rod within said housing and extending alongside a face of said ring, but having, on its outer end, a brake shoe bearing on said ring to fractionally resist rotation of said ring, a spring urging said rod endwise in a direction to apply said brake shoe against said ring, a shaft rockably supported by said housing with a connection therefrom to said rod to move it endwise in a direction to oppose said spring and move said shoe out of contact with said ring, said shaft extending exteriorly of the housing and there having a crank arm and a treadle coupled to said crank arm for rocking said shaft in a direction to remove said shoe from said ring when rotation of said carrier is desired.

10. In a filing device having a housing open at the top, a file carrier rotatably mounted therein for rotation about a horizontal axis, a plurality of file holders on the peripheral part of said carrier brought in succession into exposed position at the open top of the housing upon rotation of the carrier, that improvement which comprises the combination with said carrier and housing, of an endless ring concentric with said axis and attached to said carrier to rotate therewith, a radially disposed brake rod within said housing and extending alongside a face of said ring, but having, on its outer end, a brake shoe bearing on said ring to frictionally resist rotation of said ring, a spring urging said rod endwise in a direction to apply said brake shoe against said ring, a shaft rockably supported by said housing with a connection therefrom to said rod to move it endwise in a direction to oppose said spring and move said shoe out of contact with said ring, said shaft extending exteriorly of the housing at opposite walls thereof and at each end having a crank arm, and a treadle coupled to either of said crank arms to rock the shaft in a direction to remove said shoe from said ring when rotation of said carrier is desired.

11. In a filing device having a housing open at the top, a file carrier rotatably mounted therein for rotation about a horizontal axis, a plurality of file holders on the peripheral part of said carrier brought in succession into exposed position at the open top of the housing upon rotation of the carrier, that improvement which comprises the combination with said carrier and housing, of an endless ring concentric with said axis and attached to said carrier to rotate therewith, a radially disposed brake rod within said housing and extending alongside a face of said ring, but having, on its outer end, a brake shoe bearing on said ring to frictionally resist rotation of said ring, a spring urging said rod endwise in a direction to apply said brake shoe against said ring, a lever engageable with said rod to move the latter endwise against the action of said spring, a shaft rockably mounted by said housing and having an end extending beyond the housing, a crank on the extending end of said shaft, an arm on said shaft, a link connecting said lever and said arm, and a treadle coupled to said crank and resting at its free end on the support for said housing.

12. In a filing device having a housing open at the top, a file carrier rotatably mounted therein for rotation about a horizontal axis, that improvement which comprises the combination therewith, of an endless ring attached to said carrier within the housing and concentric with said axis, a shaft extending horizontally within said housing near the bottom thereof, mounted for rotation about its longitudinal axis, and at an end extending exteriorly of the housing, then back along the exterior of the housing parallel to its said longitudinal axis to serve as a crank arm, a treadle arm swivelled at one end on said crank arm for rocking movement about the axis of said crank arm, and at its free end having a depending flange to engage the surface on which said housing rests, a brake element movable toward and from said ring and spring pressed against said ring to stop its rotation, and an operating connection between said shaft and brake element for moving said brake element out of contact with said ring when said treadle arm is depressed.

13. In a filing device having a housing open at the top, a file carrier rotatably mounted therein for rotation about a horizontal axis, that improvement which comprises the combination therewith, of an endless ring attached to said carrier within the housing and concentric with said axis, a shaft extending horizontally within said housing near the bottom thereof, mounted for rotation about its longitudinal axis, and at an end extending exteriorly of the housing, then back along the exterior of the housing parallel to its said longitudinal axis to serve as a crank arm, a treadle arm swivelled at one end on said crank arm for rocking movement about the axis of said crank arm, and at its free end having a depending flange to engage the surface on which said housing rests, a collar fixed on said crank arm but spaced from its end on which said treadle arm is swivelled, a spring catch on said swivelled end and riding on said collar, said collar having a wall past which said catch is cammed when said treadle arm is swung into upright position on the crank arm to hold it elevated alongside said housing when not in use, a brake element movable toward and from said ring and spring pressed against said ring to stop its rotation, and an operating connection between said shaft and brake element for moving said brake element out of contact with said ring when said treadle arm is depressed.

FLOYD H. CLARK.
BENGT M. HAGER.
OSCAR J. LARSON.

REFERENCES CITED

The following references are of record in the file of this patent:

UNITED STATES PATENTS

| Number | Name | Date |
|---|---|---|
| 557,948 | Bever | Apr. 7, 1896 |
| 1,030,898 | Langdale | July 2, 1912 |
| 1,125,391 | Perreten | Jan. 19, 1915 |
| 1,269,825 | Langdon | June 18, 1918 |
| 1,587,713 | Franzen | June 8, 1926 |
| 1,867,145 | Godfrey | July 12, 1932 |
| 1,918,195 | Robertson | July 11, 1933 |
| 2,235,736 | Bruen | Mar. 18, 1941 |
| 2,343,280 | Cory | Mar. [illegible]4 |